United States Patent
Egger et al.

(10) Patent No.: US 9,727,528 B2
(45) Date of Patent: Aug. 8, 2017

(54) RECONFIGURABLE PROCESSOR WITH ROUTING NODE FREQUENCY BASED ON THE NUMBER OF ROUTING NODES

(75) Inventors: Bernhard Egger, Seoul (KR); Taisong Jin, Seoul (KR); Won-Sub Kim, Anyang-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 596 days.

(21) Appl. No.: 13/178,062

(22) Filed: Jul. 7, 2011

(65) Prior Publication Data

US 2012/0204001 A1 Aug. 9, 2012

(30) Foreign Application Priority Data

Feb. 8, 2011 (KR) .................. 10-2011-0011215

(51) Int. Cl.
*G06F 15/78* (2006.01)
*G06F 9/38* (2006.01)

(52) U.S. Cl.
CPC ........ *G06F 15/7892* (2013.01); *G06F 9/3869* (2013.01)

(58) Field of Classification Search
CPC .................................................. G06F 9/3869
USPC ......................................................... 712/15
See application file for complete search history.

(56) References Cited

U.S. PATENT DOCUMENTS

| | | | |
|---|---|---|---|
| 5,721,695 A * | 2/1998 | McMinn et al. ............... | 703/14 |
| 6,826,709 B1 | 11/2004 | Clermidy et al. | |
| 7,096,343 B1 | 8/2006 | Berenbaum et al. | |
| 8,055,880 B2 * | 11/2011 | Fujisawa et al. ............... | 712/15 |
| 2003/0135710 A1 | 7/2003 | Farwell et al. | |
| 2005/0262370 A1 * | 11/2005 | Tsui et al. ...................... | 713/375 |
| 2005/0268075 A1 * | 12/2005 | Caprioli et al. ............... | 712/239 |
| 2007/0094485 A1 | 4/2007 | Kim et al. | |
| 2007/0118548 A1 | 5/2007 | Carapella et al. | |
| 2007/0204131 A1 | 8/2007 | Huppenthal et al. | |
| 2008/0116931 A1 * | 5/2008 | Schmit et al. .................. | 326/41 |
| 2009/0070552 A1 | 3/2009 | Kanstein et al. | |
| 2009/0259824 A1 * | 10/2009 | Smith et al. .................... | 712/10 |
| 2010/0199069 A1 | 8/2010 | Kim et al. | |

FOREIGN PATENT DOCUMENTS

EP 0 712 208 A2 9/1995
JP H 08-254571 A1 10/1996

OTHER PUBLICATIONS

Giefers and Platzner, Realizing Reconfigurable Mesh Algorithms on Softcore Arrays, 2008, IEEE, 1-8.*

(Continued)

*Primary Examiner* — Andrew Caldwell
*Assistant Examiner* — Jyoti Mehta
(74) *Attorney, Agent, or Firm* — NSIP Law (57) ABSTRACT

Provided is a reconfigurable processor capable of reducing the routing processing time of routing nodes by driving the routing nodes at a greater frequency than a driving frequency of the processing elements. The reconfigurable processor includes one or more processing elements configured to be driven at a first driving frequency, and one or more routing nodes configured to be provided on paths that are formed between the processing elements, and to be driven at a second driving frequency that is greater than the first driving frequency.

12 Claims, 5 Drawing Sheets

(56) References Cited

OTHER PUBLICATIONS

Microprocessor Quick Reference Guide, Jan. 1, 2006, Intel, p. 1-2.*
Luo et al, Low Power Network Processor Design Using Clock Gating, Jun. 13-17, 2005, DAC 2005, 1.*
Parhi, Chapter 3 Pipelining and Parallel processing, Aug. 23, 2003, 34 pages, retrieved from the internet on May 19, 2015, retrieved from URL <http://www.ece.umn.edu/users/parhi/SLIDES/chap3.pdf>.*
Korean Office Action issued on Aug. 20, 2016 in counterpart Korean Patent Application No. 10-2011-0011215 (9 pages with English translation).

* cited by examiner

| PATH | ROUTING NODE QUANTITY |
|------|----------------------|
| 300  | 2 |
| 310  | 2 |
| 320  | 5 |
| 330  | 2 |
| 340  | 2 |
| 350  | 3 |
| 360  | 2 |

FIG. 5 ations of Korean Patent Application No. 10-2011-0011215, filed on Feb. 8, 2011, in the Korean Intellectual Property Office, the entire disclosure of which is incorporated herein by reference for all purposes.

RECONFIGURABLE PROCESSOR WITH ROUTING NODE FREQUENCY BASED ON THE NUMBER OF ROUTING NODES

CROSS-REFERENCE TO RELATED APPLICATION(S)

This application claims the benefit under 35 U.S.C. §119(a) of Korean Patent Application No. 10-2011-0011215, filed on Feb. 8, 2011, in the Korean Intellectual Property Office, the entire disclosure of which is incorporated herein by reference for all purposes.

BACKGROUND

1. Field

The following description relates to a driving control technique for a plurality of processing elements and a plurality of routing nodes that are included in a reconfigurable array.

2. Description of the Related Art

Reconfigurable architecture may modify a hardware configuration of a computing device such that the hardware configuration is more optimized for processing a predetermined task.

If a task is processed only in a hardware manner, even a small change to the task makes it difficult for the hardware to process the task because of the rigidity of the hardware. On the other hand, if a task is processed only in a software manner, it is possible to process the task by changing the software to be more suitable for processing the task, however, the processing speed is slower than when processing the task using the hardware. The reconfigurable architecture combines the advantages of hardware and software.

The reconfigurable architecture may use a reconfigurable array including a plurality of processing elements and a plurality of routing nodes. However, processing delays in the routing nodes that are disposed between the processing elements may result in delays in the processing and transmission of data. Therefore, a technique is needed to reduce the routing processing time of the routing nodes.

SUMMARY

In one general aspect, there is provided a reconfigurable processor, including one or more processing elements configured to be driven at a first driving frequency, and one or more routing nodes provided on paths that are formed between the processing elements, and configured to be driven at a second driving frequency that is greater than the first driving frequency.

The reconfigurable processor may further comprise a determination unit configured to determine the second driving frequency based on a number of routing nodes on each of the paths.

The reconfigurable processor may further comprise a determination unit configured to select one or more processing elements to which instructions are to be mapped, to extract at least one path that is formed between the selected processing elements, to calculate a number of is routing nodes on the extracted at least one path, and to determine the second driving frequency based on the calculated number of routing nodes.

The reconfigurable processor may further comprise a determination unit configured to, in response to there being N routing nodes on each of the paths, determine a frequency that is N times greater than the first driving frequency as the second driving frequency.

The reconfigurable processor may further comprise a determination unit configured to, in response to there being five paths between the processing elements and there being a maximum of M routing nodes on each of the five paths, determine a frequency that is M times greater than the first driving frequency as the second driving frequency.

The reconfigurable processor may further comprise a control unit configured to control the processing elements to be driven at the first driving frequency, and to control the routing nodes to be driven at the second driving frequency.

In one general aspect, there is provided a driving control method of a reconfigurable processor, the driving control method including extracting a first driving frequency for one or more processing elements that are configured to be driven at a first driving frequency, determining a second driving frequency for one or more routing nodes provided on paths that are formed between the processing elements, wherein the second driving frequency is greater than the first driving frequency, and controlling the processing elements to be driven at the first driving frequency and controlling the routing nodes to be driven at the second driving frequency.

The determining the second driving frequency may comprise determining the second driving frequency based on a number of routing nodes on each of the paths.

The determining the second driving frequency may comprise selecting one or more processing elements to which instructions are to be mapped, extracting at least one path that is is formed between the selected processing elements, calculating a number of routing nodes on the extracted at least one path, and determining the second driving frequency based on the calculated number of routing nodes.

The determining the second driving frequency may comprise, in response to there being N routing nodes on each of the paths, determining a frequency that is N times greater than the first driving frequency as the second driving frequency.

The determining the second driving frequency may comprise, in response to there being five paths between the processing elements and there being a maximum of M routing nodes on each of the five paths, determining a frequency that is M times greater than the first driving frequency as the second driving frequency.

In another aspect, there is provided a processor that includes a plurality of processing elements that process data at a first frequency and a plurality of routing nodes disposed on paths between the plurality of processing elements, the processor including a determination unit to extract a path between at least two selected processing elements, to calculate the number of routing nodes on the extracted path, and to determine a second frequency for the routing nodes on the extracted path based on the amount of routing nodes on the extracted path, wherein the second frequency is greater than the first frequency, and a controller to drive the at least two selected processing elements at the first frequency and to drive the routing nodes at the second frequency.

The number of routing nodes on the extracted path may be N, and the determination unit may determine the second frequency to be the N times greater than the first frequency.

The determination unit may extract a plurality of paths between a plurality of pairs of processing elements, determines the maximum number of routing nodes on a path from among the plurality of paths, and determines the second frequency based on the maximum number of is routing nodes on a path.

The processor may be a reconfigurable array, and the processor may further comprise a configuration memory to store configuration information about the reconfigurable array.

Other features and aspects may be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, is various changes, modifications, and equivalents of the methods, apparatuses, and/or systems described herein will be suggested to those of ordinary skill in the art. Also, descriptions of well-known functions and constructions may be omitted for increased clarity and conciseness.

Figure 1:
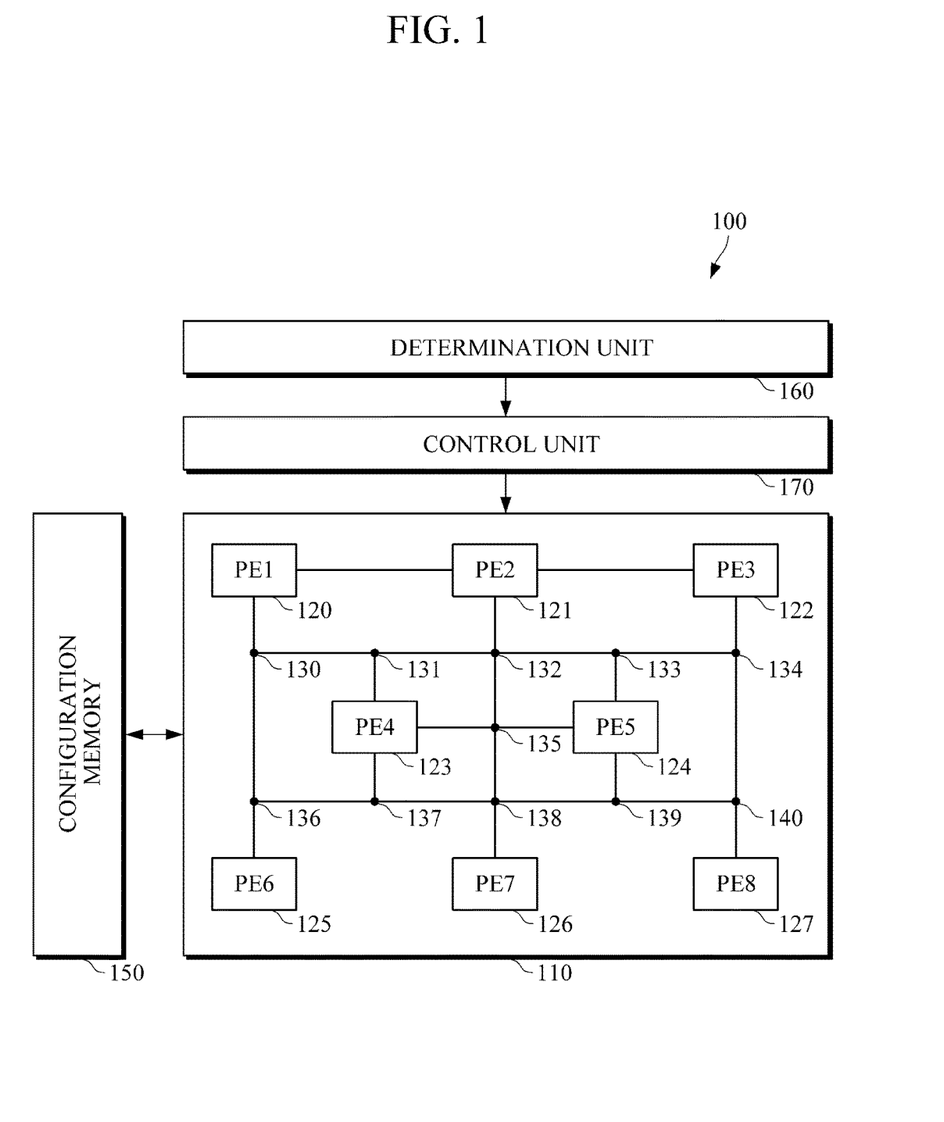
FIG. 1 is a diagram illustrating an example of a reconfigurable processor.

FIG. 1 illustrates an example of a reconfigurable processor. The reconfigurable processor may be included in a device that processes data, for example, a computer, a mobile terminal, a smart phone, a laptop computer, a personal digital assistant, a tablet, an MP3 player, and the like.

Referring to FIG. 1, reconfigurable processor 100 includes a reconfigurable array 110, a configuration memory 150, a determination unit 160, and a control unit 170.

The reconfigurable array 110 may include a plurality of processing elements and a plurality of routing nodes. For example, the reconfigurable array 110 may include a plurality of processing elements (i.e., PE1 (120), PE2 (121), PE3 (122), PE4 (123), PE5 (124), PE6 (125), PE7 (126), and PE8 (127)) and a plurality of routing nodes 130, 131, 132, 133, 134, 135, 136, 137, 138, 139, and 140. In this example, each of the routing nodes 130, 131, 132, 133, 134, 135, 136, 137, 138, 139, and 140 may include multiplexer and/or a latch. It should be appreciated that the numbers of processing elements and the number of routing nodes in the reconfigurable array 110 and the pattern of the connections between the processing elements and the routing nodes in the reconfigurable array 110 is not limited to the example illustrated in FIG. 1.

The processing elements 120, 121, 122, 123, 124, 125, 126, and 127 may process instructions in parallel. The data that is processed by the processing elements 120, 121, 122, 123, 124, 125, 126, and 127 may be transmitted via the routing nodes 130, 131, 132, 133, 134, 135, 136, 137, 138, 139, and 140. For example, each of the processing elements 120, 121, 122, 123, 124, 125, 126, and 127 may include a function unit (FU) or may include both an FU and a is register.

The routing nodes 130, 131, 132, 133, 134, 135, 136, 137, 138, 139, and 140 may be disposed on paths that are formed between the processing elements 120, 121, 122, 123, 124, 125, 126, and 127.

The processing elements 120, 121, 122, 123, 124, 125, 126, and 127 may be driven at a first driving frequency. The routing nodes 130, 131, 132, 133, 134, 135, 136, 137, 138, 139, and 140 may be driven at a second driving frequency. The second driving frequency may be greater than the first driving frequency. By driving the routing nodes 130, 131, 132, 133, 134, 135, 136, 137, 138, 139, and 140 at the second driving frequency that is greater than the first driving frequency, the reconfigurable processor 100 may reduce the routing processing time of the routing nodes 130, 131, 132, 133, 134, 135, 136, 137, 138, 139, and 140.

For example, if the second driving frequency is twice as much as the first driving frequency, the routing processing time of the routing nodes 130, 131, 132, 133, 134, 135, 136, 137, 138, 139, and 140 may be reduced to half the data processing time of the processing elements 120, 121, 122, 123, 124, 125, 126, and 127. Accordingly, if the data processing time of the processing elements 120, 121, 122, 123, 124, 125, 126, and 127 is two seconds, the routing processing time of the routing nodes 130, 131, 132, 133, 134, 135, 136, 137, 138, 139, and 140 may be one second.

Even if multiple routing nodes exist between two processing elements, the routing processing time of the multiple routing nodes may be reduced by adjusting the driving frequency for the multiple routing nodes. Accordingly, it is possible to reduce delays in the routing processing time of the multiple routing nodes and, in return, reduce delays in the processing of data.

The configuration memory 150 may store configuration information of the reconfigurable array 110. For example, the configuration information of the reconfigurable array 110 may include instruction information about instructions that are to be executed by the processing elements 120, 121, 122, 123, 124, 125, 126, and 127, information about data that is to be stored in the registers of the processing elements 120, 121, 122, 123, 124, 125, 126, and 127, information indicating the data that the routing nodes 130, 131, 132, 133, 134, 135, 136, 137, 138, 139, and 140 are to choose, information indicating which of the processing elements 120, 121, 122, 123, 124, 125, 126, and 127 the routing nodes 130, 131, 132, 133, 134, 135, 136, 137, 138, 139, and 140 are to transmit data to, information for driving the reconfigurable processor 100, connection state information corresponding to the reconfigurable array 110, and information about a driving method of the reconfigurable array 110. For example, the configuration memory 150 may store instructions and/or information to be executed or processed by the processing elements 120, 121, 122, 123, 124, 125, 126, and 127 and the routing nodes 130, 131, 132, 133, 134, 135, 136, 137, 138, 139, and 140 for each cycle. Each cycle may be determined based on an iteration interval (II), the first driving frequency, and the second driving frequency.

The determination unit 160 may determine the second driving frequency. For example, the determination unit 160 may determine the second driving frequency based on the number of routing nodes on the paths that are formed between the processing elements 120, 121, 122, 123, 124, 125, 126, and 127.

The determination unit 160 may select one or more processing elements to which instructions are to be mapped from among the processing elements 120, 121, 122, 123, 124, 125, 126, and 127. The determination unit 160 may extract at least one path between the selected processing elements and may calculate the number of routing nodes on each of the extracted path. Accordingly, the determination unit 160 may determine the second driving frequency based on is the results of the calculation.

In response to N routing nodes being located on the extracted path, the determination unit 160 may determine a frequency that is N times greater than the first driving frequency as the second driving frequency. For example, in response to N being three, the determination unit 160 may determine a frequency that is three times greater than the first driving frequency as the second driving frequency. An example of determining the second driving frequency is further described with reference to FIG. 2.

If a maximum of the numbers of routing nodes on multiple paths is M, the determination unit 160 may determine the second driving frequency to be a frequency that is M or more times greater than the first driving frequency. For example, the determination unit 160 may extract the number of routing nodes on multiple paths and may extract a maximum number of routing nodes on the multiple paths. For example, if the maximum number of routing nodes is four, the determination unit 160 may determine the second driving frequency to be a frequency that is four times greater than the first driving frequency. Another example of determining the second driving frequency is further described with reference to FIGS. 3 and 4.

The control unit 170 may include a compiler (not shown) that maps instructions to the processing elements 120, 121, 122, 123, 124, 125, 126, and 127.

In various aspects, the reconfigurable processor 100 may have multiple modes, for example, a coarse-grained array (CGA) mode and a very long instruction word (VLIW) mode. As an example, the reconfigurable processor 100 may perform a loop operation in the CGA mode and may perform a regular operation in the VLIW mode. The control unit 170 may switch the reconfigurable processor 100 between the CGA mode and the VLIW mode.

The control unit 170 may control the processing elements 120, 121, 122, 123, 124, 125, 126, and 127 such that the processing elements are driven at the first driving frequency and may is control the routing nodes 130, 131, 132, 133, 134, 135, 136, 137, 138, 139, and 140 such that the routing nodes are driven at the second driving frequency.

Figure 2:
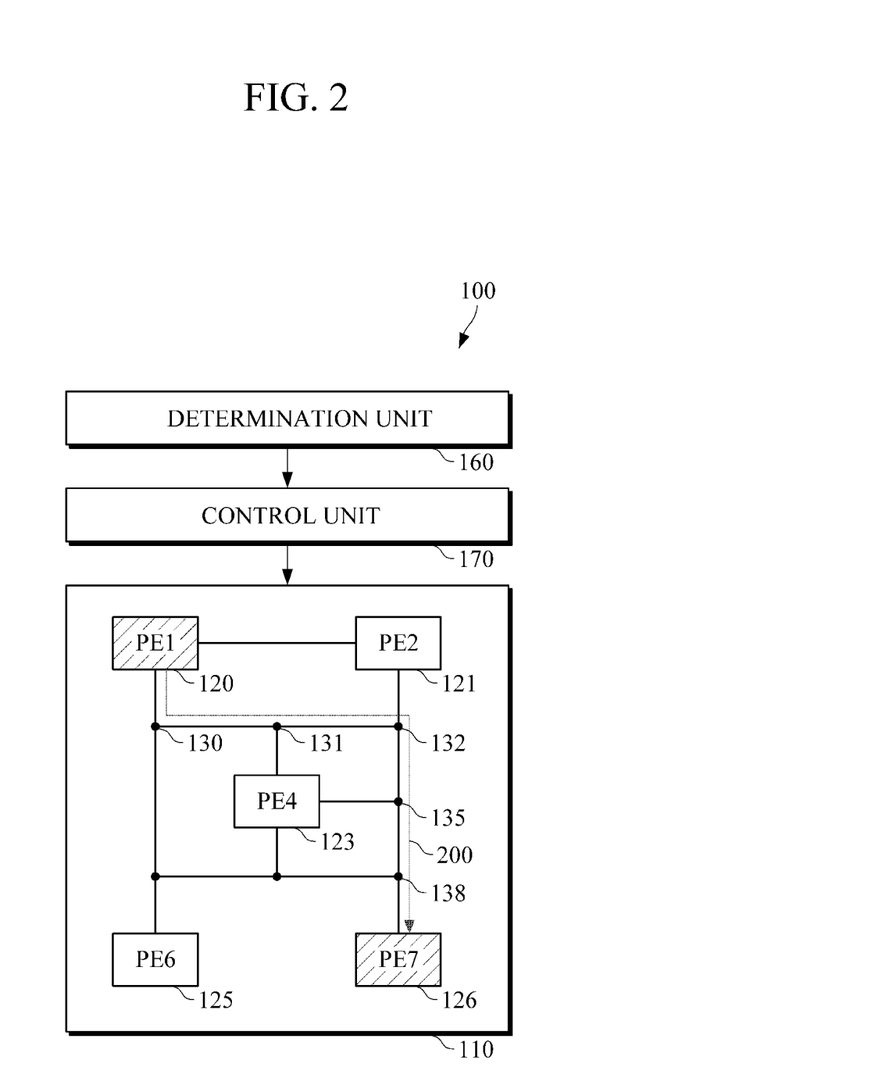
FIG. 2 is a diagram illustrating an example of driving the reconfigurable processor illustrated in FIG. 1.

FIG. 2 illustrates an example of driving the reconfigurable processor illustrated in FIG. 1.

Referring to FIG. 2, reconfigurable processor 100 includes the reconfigurable array 110, the determination unit 160, and the control unit 170.

In this example, the reconfigurable array 110 includes the processing elements 120, 121, 123, 125, and 126 and the routing nodes 130, 131, 132, 135, and 138. It should be appreciated that the number of processing elements and the number of routing nodes in the reconfigurable array 110 and the pattern of the connections between the processing elements and the routing nodes in the reconfigurable array 110 is not limited to the example illustrated in FIG. 2.

The processing elements 120, 121, 123, 125, and 126 may be driven at a first driving frequency. The routing nodes 130, 131, 132, 135, and 138 may be driven at a second driving frequency that is greater than the first driving frequency.

The control unit 170 may select one or more processing elements to which instructions are to be mapped from among the processing elements 120, 121, 123, 125, and 126. For example, the control unit 170 may select the processing elements 120 and 126.

The determination unit 160 may determine the second driving frequency based on the number of routing nodes on a path 200 that is between the processing elements 120 and 126. In this example the number of routing nodes on the path 200 is five. Accordingly, the determination unit 160 may determine the second driving frequency to be a frequency that is five times greater than the first driving frequency.

The control unit 170 may control the processing elements 120, 121, 123, 125, and 126 to be driven at the first driving frequency, and may control the routing nodes 130, 131, 132, 135, and 138 to be driven at the second driving frequency. For example, if it takes three seconds for is each processing element driven at the first driving frequency to process data, and the second driving frequency is five or more times greater than the first driving frequency, the routing processing time of each routing node driven at the second driving frequency may be 0.6 seconds or less. In this example, the combined routing processing time of five routing nodes combined may be 3 seconds or less.

If the second driving frequency is five times greater than the first driving frequency, the combined data processing time of the processing elements 120, 121, 123, 125, and 126 and the combined routing processing time of the routing nodes 130, 131, 132, 135, and 138 may both be three seconds. In this example, because the combined data processing time of the processing elements 120, 121, 123, 125, and 126 is the same as the combined routing processing time of the routing nodes 130, 131, 132, 135, and 138, there is no need for a synchronization process for synchronizing data processing performed by the processing elements 120, 121, 123, 125, and 126 and routing processing performed by the routing nodes 130, 131, 132, 135, and 138.

If the second driving frequency is more than five times greater than the first driving frequency, the combined data processing time of the processing elements 120, 121, 123, 125, and 126 may be greater than the combined routing processing time of the routing nodes 130, 131, 132, 135, and 138. In this example, a synchronization process for synchronizing data processing performed by the processing elements 120, 121, 123, 125, and 126 and routing processing performed by the routing nodes 130, 131, 132, 135, and 138 may be performed.

Thus, it may be more efficient if the second driving frequency is just five times greater than the first driving frequency instead of the second driving frequency being more than five times greater than the first driving frequency because the former does not require a synchronization process.

Figure 3:
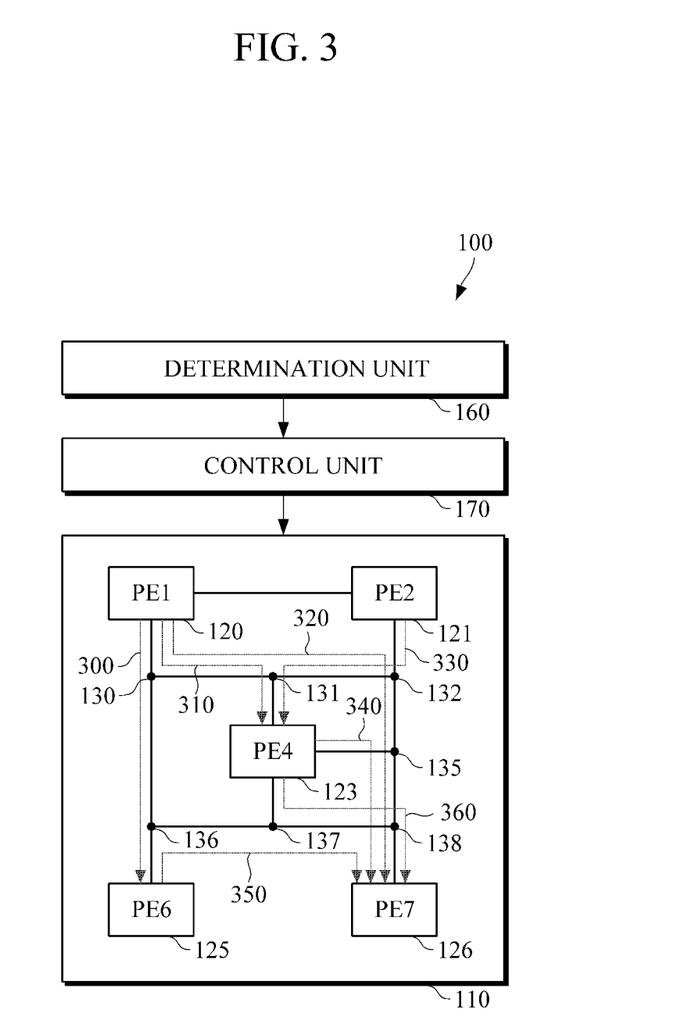
FIG. 3 is a diagram illustrating another example of driving the reconfigurable processor illustrated in FIG. 1.

FIG. 3 illustrates another example of driving the reconfigurable processor illustrated in FIG. 1.

Referring to FIG. 3, reconfigurable processor 100 includes the reconfigurable array 110, the determination unit 160, and the control unit 170.

In this example, the reconfigurable array 110 includes the processing elements 120, 121, 123, 125, and 126 and the routing nodes 130, 131, 132, 135, 136, 137, and 138. It should be appreciated that the number of processing elements and the number of routing nodes in the reconfigurable array 110 and the pattern of the connections between the processing elements and the routing nodes in the reconfigurable array 110 is not limited to the example illustrated in FIG. 3.

The processing elements 120, 121, 123, 125, and 126 may be driven at a first driving frequency. The routing nodes 130, 131, 132, 135, 136, 137, and 138 may be driven at a second driving frequency that is greater than the first driving frequency.

The determination unit 160 may determine the second driving frequency based on a maximum of the numbers of routing nodes on a first, a second, a third, a fourth, a fifth, and a sixth path 300, 310, 320, 330, 340, 350, and 360, respectively, that are formed between the processing elements 120, 121, 123, 125, and 126.

In this example, the determination unit 160 may extract the number of routing nodes on each of the first, second, third, fourth, fifth, and sixth paths 300, 310, 320, 330, 340, 350, and 360, and may extract the maximum of the extracted number of routing nodes.

Figure 4:
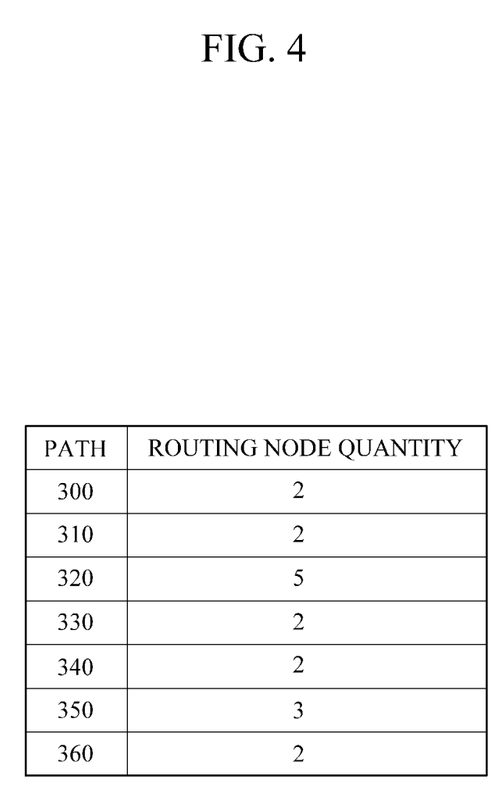
FIG. 4 is a table illustrating an example of the number of routing nodes on each path illustrated in FIG. 3.

FIG. 4 is a table that illustrates an example of the number of routing nodes on each of the first, second, third, fourth, fifth, and sixth paths 300, 310, 320, 330, 340, 350, and 360 illustrated in FIG. 3.

Referring to the example of FIG. 4, there are two routing nodes on the first path 300, two is routing nodes on the second path 310, five routing nodes on the third path 320, two routing nodes on the fourth path 330, two routing nodes on the fifth path 340, three routing nodes on the sixth path 350, and two routing nodes on the seventh path 360.

In this example, the maximum number of routing nodes on a path is five. Accordingly, the determination unit 160 may extract a value of five as the maximum number of routing nodes, and may determine the second driving frequency to be a frequency that is five times greater than the first driving frequency.

The control unit 170 may control the processing elements 120, 121, 123, 125, and 126 to be driven at the first driving frequency, and may control the routing nodes 130, 131, 132, 135, 136, 137, and 138 to be driven at the second driving frequency.

For example, if it takes three seconds for each processing element to process data while being driven at the first driving frequency, and the second driving frequency is five or more times greater than the first driving frequency, the routing processing time of each routing node driven at the second driving frequency may be 0.6 seconds or less. Accordingly, the combined routing time of the routing nodes on the first path 300 may be 1.2 seconds or less, the combined routing time of the routing nodes on the second path 310 may be 1.2 seconds or less, the combined routing time of the routing nodes on the third path 320 may be 3 seconds or less, the combined routing time of the routing nodes on the fourth path 330 may be 1.2 seconds or less, the combined routing time of the routing nodes on the fifth path 340 may be 1.2 seconds, the combined routing time of the routing nodes on the sixth path 350 may be 1.8 seconds or less, and the combined routing time of the routing nodes on the seventh path 360 may be 1.2 seconds or less. Therefore, it is possible to perform the routing of data within 3 seconds or less using any of the first, second, third, fourth, fifth, and sixth paths 300, 310, 320, 330, 340, 350, and 360, respectively.

If the data processing time of the processing elements 120, 121, 123, 125, and 126 and the routing processing time of the routing nodes 130, 131, 132, 135, 136, 137, and 138 do not coincide with each other, a synchronization process for synchronizing the data processing time of the processing elements 120, 121, 123, 125, and 126 and the routing processing time of the routing nodes 130, 131, 132, 135, 136, 137, and 138 may be performed.

For example, the control unit 170 may perform scheduling for mapping instructions to the processing elements 120, 121, 123, 125, and 126 based on an assumption that the data processing time of the processing elements 120, 121, 123, 125, and 126 is three seconds and the routing processing time of the routing nodes 130, 131, 132, 135, 136, 137, and 138 is less than three seconds. In this example, because scheduling delays do not occur, the controller 170 can effectively perform scheduling for mapping instructions to the processing elements 120, 121, 123, 125, and 126.

Figure 5:
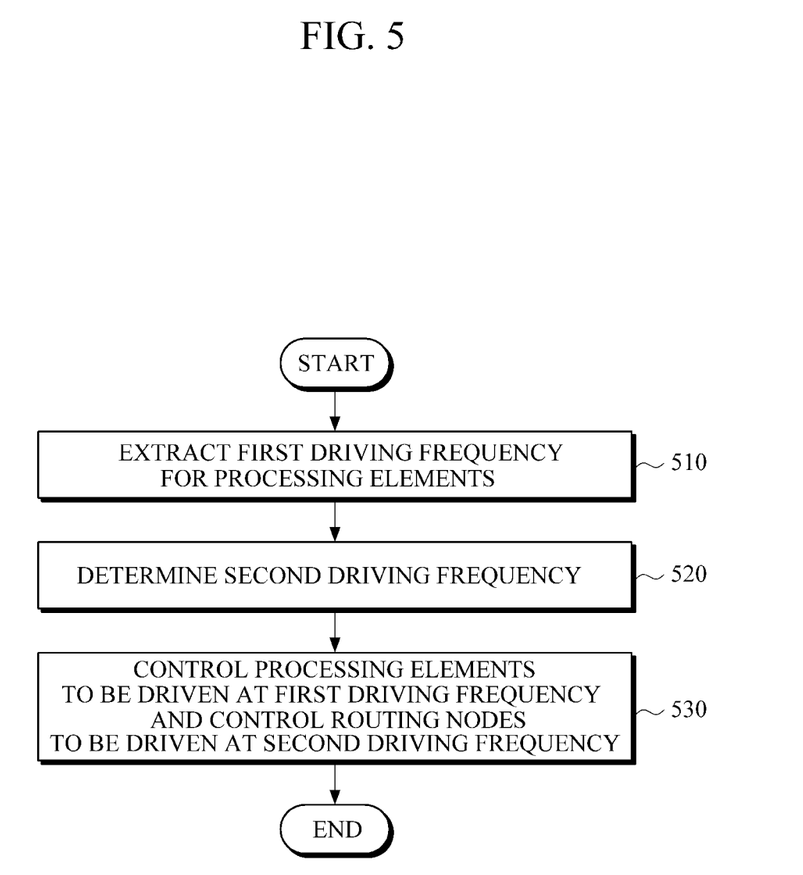
FIG. 5 is a flowchart illustrating an example of a driving control method of a reconfigurable processor.

FIG. 5 illustrates an example of a driving control method of a reconfigurable processor.

Referring to FIG. 5, in 510, a reconfigurable processor extracts a first driving frequency for a plurality of processing elements. In 520, the reconfigurable processor determines the second driving frequency to be a frequency that is a greater than the first driving frequency as a second driving frequency. For example, the reconfigurable processor may determine the second driving frequency based on the number of routing nodes that are located along a path between the processing elements. The reconfigurable processor may select one or more processing elements to which instructions are to be mapped, extract at least one path that is formed between the selected processing elements, calculate the number of routing nodes on the extracted path, and determine the second driving frequency based on the results of the calculation.

For example, if the number of routing nodes on a path between the selected processing is elements is N, the reconfigurable processor may determine the second driving frequency as a frequency that is N times greater than the first driving frequency.

As another example, in if a maximum of the numbers of routing nodes on any of the paths between the selected processing elements is M, the reconfigurable processor may determine a frequency that is M times greater than the first driving frequency as the second driving frequency.

The second driving frequency is a driving frequency for the routing nodes that exist on the paths between the processing elements. In 530, the reconfigurable processor controls the processing elements to be driven at the first driving frequency, and controls the routing nodes to be driven at the second driving frequency.

As described herein, it is possible to reduce the routing processing time of routing nodes by using a greater frequency to drive the routing nodes in comparison to the driving frequency for driving the processing elements. Therefore, it is possible to prevent delays in the transmission of data and prevent delays in the processing of data by the processing elements. Program instructions to perform a method described herein, or one or more operations thereof, may be recorded, stored, or fixed in one or more computer-readable storage media.

The program instructions may be implemented by a computer. For example, the computer may cause a processor to execute the program instructions. The media may include, alone or in combination with the program instructions, data files, data structures, and the like. Examples of computer-readable storage media include magnetic media, such as hard disks, floppy disks, and magnetic tape; optical media such as CD ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The program instructions, that is, software, may be distributed over network coupled computer systems so that the software is stored and executed in a distributed fashion. For example, the software and data may be stored by one or more computer readable storage mediums. Also, functional programs, codes, and code segments for accomplishing the example embodiments disclosed herein can be easily construed by programmers skilled in the art to which the embodiments pertain based on and using the flow diagrams and block diagrams of the figures and their corresponding descriptions as provided herein. Also, the described unit to perform an operation or a method may be hardware, software, or some combination of hardware and software. For example, the unit may be a software package running on a computer or the computer on which that software is running.

As a non-exhaustive illustration only, a terminal/device/unit described herein may refer to mobile devices such as a cellular phone, a personal digital assistant (PDA), a digital camera, a portable game console, and an MP3 player, a portable/personal multimedia player (PMP), a handheld e-book, a portable lab-top PC, a global positioning system (GPS) navigation, and devices such as a desktop PC, a high definition television (HDTV), an optical disc player, a setup box, and the like capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a is battery may be additionally provided to supply operation voltage of the computing system or computer. It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A reconfigurable processor, comprising:
processing elements configured to be driven at a first driving frequency;
routing nodes provided on paths that are formed between the processing elements;
determination circuitry configured to extract the first driving frequency for the processing elements, and to determine a second driving frequency greater than the first driving frequency in proportion to a number of the routing nodes; and
control circuitry configured to control the processing elements to be driven at the first driving frequency, and to control the routing nodes to be driven at the second driving frequency.

2. The reconfigurable processor of claim 1, wherein the determination circuitry is further configured to determine the second driving frequency based on a number of routing nodes on a path having a maximum number of routing nodes among the paths, wherein the path has more nodes than any other path.

3. The reconfigurable processor of claim 1, wherein the determination circuitry is further configured to select processing elements to which instructions are to be mapped, to extract at least one path that is formed between the selected processing elements, to calculate a number of routing nodes on the extracted at least one path, and to determine the second driving frequency based on the calculated number of routing nodes on a path among the extracted at least one path.

4. The reconfigurable processor of claim 1, wherein the determination circuitry is further configured to, in response to at least one path having a maximum of M routing nodes, determine the second driving frequency that is M times greater than the first driving frequency, wherein the at least one path has more nodes than other paths.

5. A driving control method of a reconfigurable processor, the driving control method comprising:
extracting, by determination circuitry, a first driving frequency for processing elements that are configured to be driven at the first driving frequency;
providing routing nodes on paths formed between the processing elements;
determining that there are N routing nodes on each of the paths;
determining, by the determination circuitry, a second driving frequency greater than the first driving frequency in proportion to a number of the routing nodes; and
controlling, by control circuitry, the processing elements to be driven at the first driving frequency and the routing nodes to be driven at the second driving frequency,
wherein the second driving frequency is N times greater than the first driving frequency.

6. The driving control method of claim 5, wherein the determining of the second driving frequency comprises determining the second driving frequency based on a number of routing nodes on each of the paths.

7. The driving control method of claim 5, wherein the determining of the second driving frequency comprises:
selecting two or more processing elements to which instructions are to be mapped;
extracting at least one path that is formed between the two or more selected processing elements; and
determining the second driving frequency based on a calculated number of routing nodes on a path among the extracted at least one path.

8. The driving control method of claim 5, wherein the determining of the second driving frequency comprises, in response to there being five paths between the processing elements and there being N routing nodes on each of the five paths, determining the second driving frequency that is N times greater than the first driving frequency.

9. A processor, comprising:
a plurality of processing elements configured to process data at a first frequency;
a plurality of routing nodes disposed on paths between the plurality of processing elements;
determination circuitry configured to:
extract a first path between at least two selected processing elements;
calculate a number of routing nodes on the extracted first path; and determine a second frequency for the routing nodes on the extracted first path, wherein the second frequency is greater than the first frequency in proportion to the number of the routing nodes; and control circuitry configured to:
    drive the at least two selected processing elements at the first frequency; and
    drive the routing nodes on the extracted first path at the second frequency.

10. The processor of claim 9, wherein a number of routing nodes on each of the paths is N, and the determination circuitry is further configured to determine the second frequency that is N times greater than the first frequency.

11. The processor of claim 9, wherein the determination circuitry is further configured to extract a plurality of paths from among the paths between a plurality of pairs of processing elements, to determine a maximum number of routing nodes on a path from among the plurality of paths, and to determine the second frequency to be M times greater than the first frequency, where M is the maximum number of routing nodes, and wherein the first path has more nodes than any other path among the plurality of paths.

12. The processor of claim 9, wherein the processor is a reconfigurable array, and wherein the processor further comprises a configuration memory configured to store configuration information about the reconfigurable array.

* * * * *